T. THUNHART.
ROPE RAILWAY.
APPLICATION FILED DEC. 24, 1913.

1,109,371.

Patented Sept. 1, 1914.
13 SHEETS—SHEET 2.

WITNESSES

INVENTOR
Titus Thunhart
BY
ATTORNEYS

T. THUNHART.
ROPE RAILWAY.
APPLICATION FILED DEC. 24, 1913.

1,109,371.

Patented Sept. 1, 1914.
13 SHEETS—SHEET 8.

Fig. 13.

T. THUNHART.
ROPE RAILWAY.
APPLICATION FILED DEC. 24, 1913.

1,109,371.

Patented Sept. 1, 1914.
13 SHEETS—SHEET 10.

WITNESSES

INVENTOR
Titus Thunhart
BY
ATTORNEYS.

T. THUNHART.
ROPE RAILWAY.
APPLICATION FILED DEC. 24, 1913.

1,109,371.

Patented Sept. 1, 1914.

WITNESSES
W. C. Baker, Jr.
O. D. Kollhaus

INVENTOR
Titus Thunhart
BY
ATTORNEYS

T. THUNHART.
ROPE RAILWAY.
APPLICATION FILED DEC. 24, 1913.

1,109,371.

Patented Sept. 1, 1914.
13 SHEETS—SHEET 12.

WITNESSES

INVENTOR
Titus Thunhart
BY
ATTORNEYS

UNITED STATES PATENT OFFICE.

TITUS THUNHART, OF LEOBEN, STYRIA, AUSTRIA-HUNGARY.

ROPE RAILWAY.

1,109,371.  Specification of Letters Patent.  Patented Sept. 1, 1914.

Application filed December 24, 1913. Serial No. 808,616.

*To all whom it may concern:*

Be it known that I, TITUS THUNHART, architect, a subject of the Emperor of Austria-Hungary, residing at Roseggerstrasse 10, Leoben, Styria, in the Empire of Austria-Hungary, have invented certain new and useful Improvements in Rope Railways, of which the following is a specification.

My invention relates to suspension railways or ropeways comprising cars suspended from several carrying ropes.

According to the invention the carrying ropes form two groups located side by side whereon the trolley carrying the car runs, the car being suspended between the groups. Secondly, I arrange at the standards and close to the carrying ropes which run continuously over the supports a guide rail which projects above the ropes and raises the car from, and permits longitudinal displacement of the same. Thirdly, I arrange on the standards freely rotatable grooved rings which guide the carrying ropes and are themselves guided on the standards by means of rollers. Fourthly, I provide a common tensioning device for one rope of the one group of carrying ropes and for the corresponding rope of the other group, the arrangement being such that if one of the carrying ropes breaks, the corresponding rope of the other group is simultaneously untensioned while the remaining ropes remain tensioned. Fifthly, I employ in addition to the traction rope which is detachably connected in known manner with the car, a second traction rope which connects the cars together and at the stations alone conveys the cars, released from the former traction rope, from the incoming onto the outgoing track. Further, I employ various novel devices which are described hereinafter.

To these ends, the invention consists in the construction, arrangement and combination of parts described hereinafter and pointed out in the claims.

One illustrative embodiment of my invention and a modification of part thereof are represented by way of example in the accompanying drawings, wherein.

Referring firstly to Figs. 1 to 5, in my improved suspension railway or ropeway the carrying ropes 1 are so arranged in pairs or groups that they constitute a track of comparatively broad gage, the car 2 being suspended between the groups. For this purpose the car 2 is suspended from a trolley comprising the frame 3 carrying rollers 4 which run on the ropes 1. To this frame 3 are connected the traction ropes 5. In this arrangement the car of the railway is firmly supported, it being impossible for the carrying ropes to jump out of their guides because the car which is suspended at both sides runs very smoothly. For carrying the car 2 two or more carrying ropes may be employed at each side of the car. In the embodiment two carrying ropes 1 are shown at each side of the car. Each carrying rope 1 is supported by and longitudinally displaceable on a curved bar or segment 7 fastened to each standard 6 by means of brackets 8 or the like, rollers 9 being journaled in the segments at some little distance apart. These rollers have a groove 10 into which the internal rib 12 of a ring or hoop 11 takes, and in which said ring is guided and can run freely. The rings 11 depend freely below the rollers 9 and each has in its outer periphery a groove for guiding one of the carrying ropes. Even when only a few guide rollers 9 are employed each ring 11 affords its rope 1 a long bearing surface movable in the longitudinal direction of the rope so that when the car passes from the standard to the suspended portion of the rope, the rope can move readily over the place of support and is not sharply bent. The rings 11 can be dispensed with if the rollers 9 are arranged sufficiently close together and are provided with a groove for receiving the carrying ropes. Alternatively, instead of employing the rings 11 and the rollers 9, sheaves may be journaled on the standards 6. The diameter of the ring 11 or sheave will preferably be greater than the vertical dimensions of the car. This mode of supporting the carrying ropes is rendered possible owing to the car being suspended at both sides. A segment-like rail 14 is preferably mounted either alongside or between the segments 7 and projects above the ropes 1 supported near it. This rail is of such a length that both its ends are located lower than the ropes where they leave the place of support. Between the wheels 4 of the car there is a groove 15 corresponding to a rail 14, so that the wheels run on the rails 14 as the car travels over the supporting places and do not therefore rest on the carrying ropes. Consequently, the carrying ropes relieved of weight in this manner can freely adjust themselves longitudinally so that when the car passes over from the rail 14 onto the freely suspended portion of the rope no sudden stresses are set up in the latter, and therefore the ropes are protected from being overloaded. Moreover, owing to this arrangement the car travels more smoothly. When the car passes from the carrying ropes 1 onto the rails 14, or vice versa, no shocks can occur, because the curvature of the rails 14 gradually changes into that of the ropes.

The standards 6 may be built of iron or wood or of both materials combined.

Figure 1:
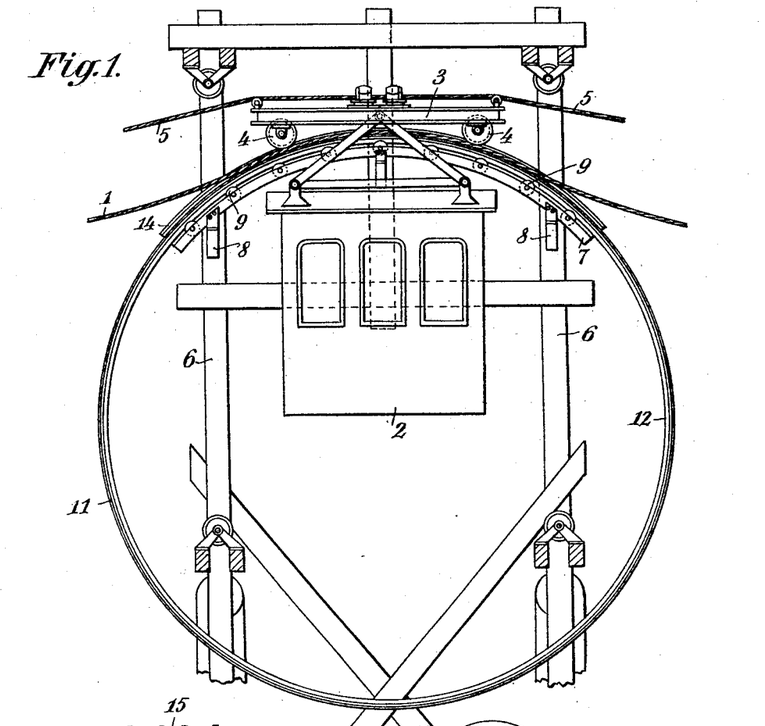
Figures 1 and 2 are side and end elevation, respectively, of the upper portion of a standard showing the supports for the carrying ropes and cars.
Figure 2:
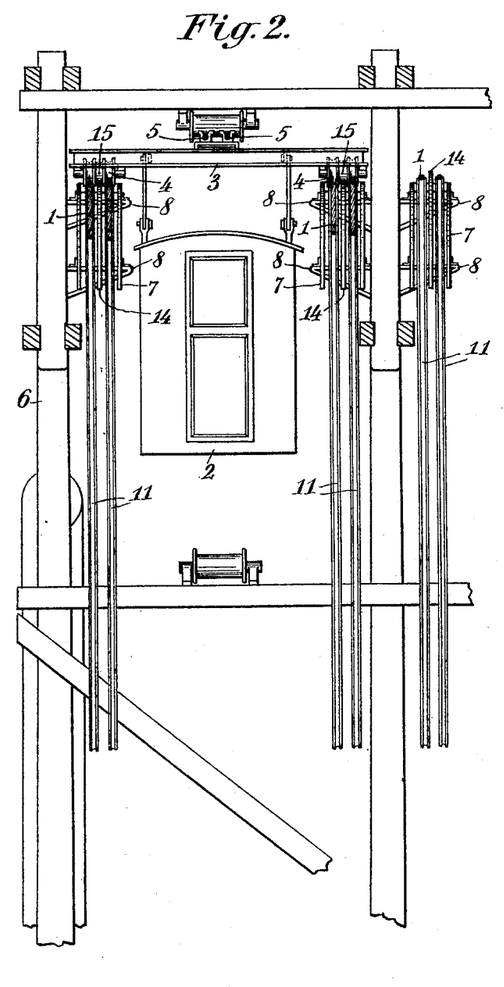
Figure 3:
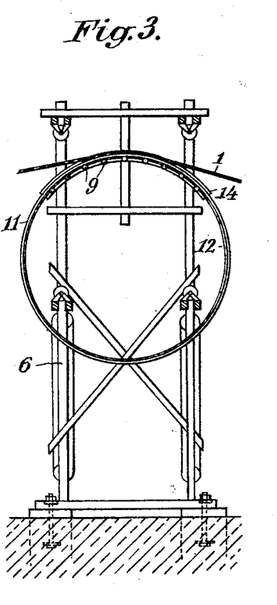
Fig. 3 is a side elevation, partly in section, of said standard.
Figure 4:
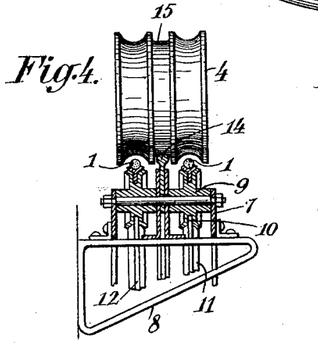
Figs. 4 and 5 are detail views.
Figure 5:
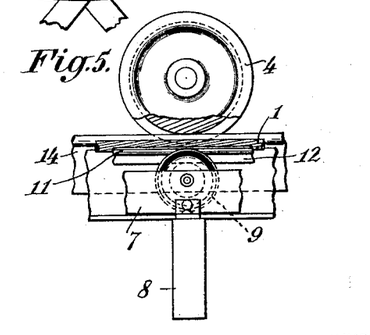
Figure 6:
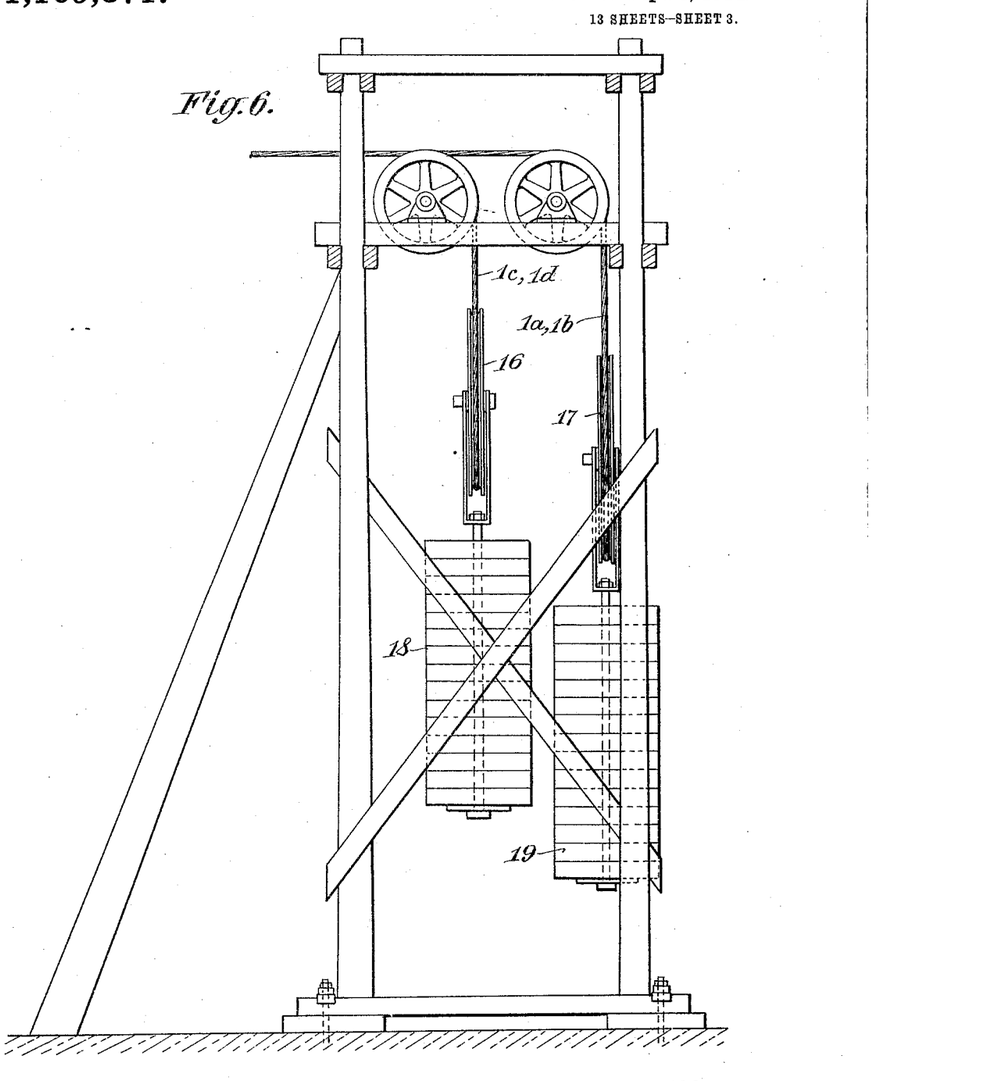
Figs. 6 and 7 are side and end elevation, respectively, showing the tensioning devices for the carrying ropes.
Figure 7:
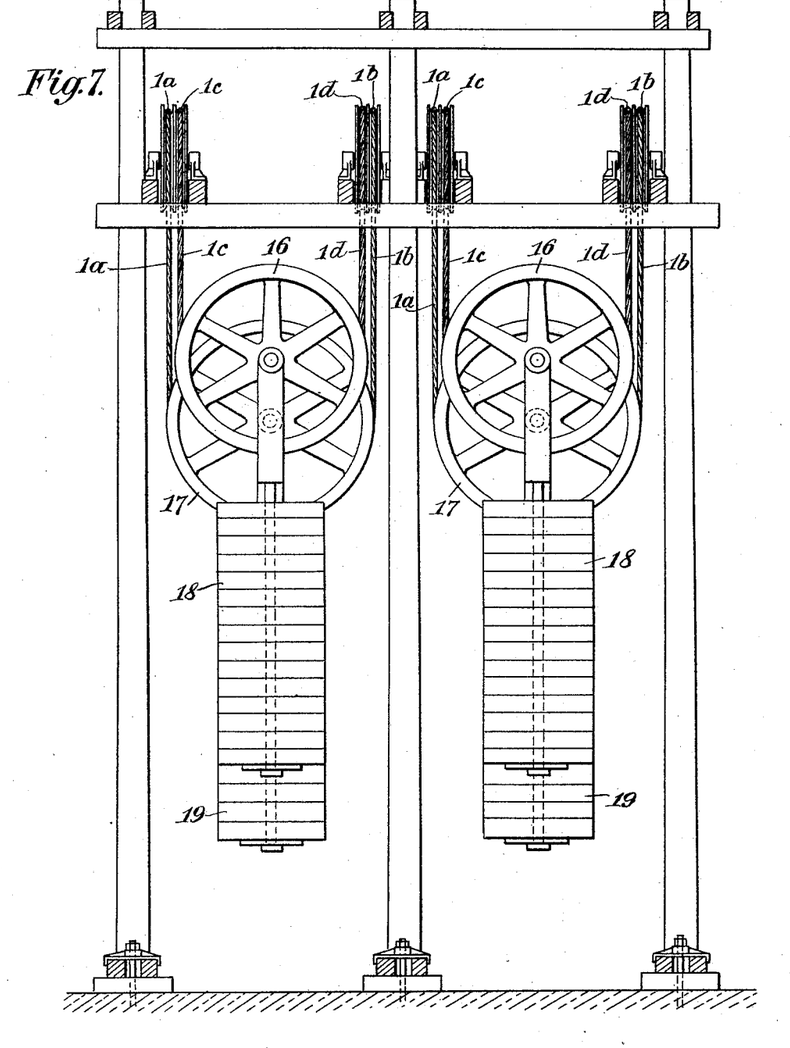

As shown in Figs. 6 and 7 the ropes $1^a$, $1^b$ and $1^c$, $1^d$ of the two groups of carrying ropes are each led over a tensioning sheave 16 and 17, respectively, each of which carries a tensioning weight 18 and 19, respectively. The pairs of ropes $1^a$, $1^b$ and $1^c$, $1^d$ are thus tensioned uniformly and independently of one another. Owing to this arrangement, in the event of a rope, e. g. $1^a$ breaking, the rope $1^b$ associated with it becomes untensioned, while the other pair of carrying ropes $1^c$ and $1^d$ remains fully tensioned and capable of sustaining the load, so that working need not be interrupted. The carrying ropes can therefore be exchanged at any time without disturbance to working.

Figure 8:
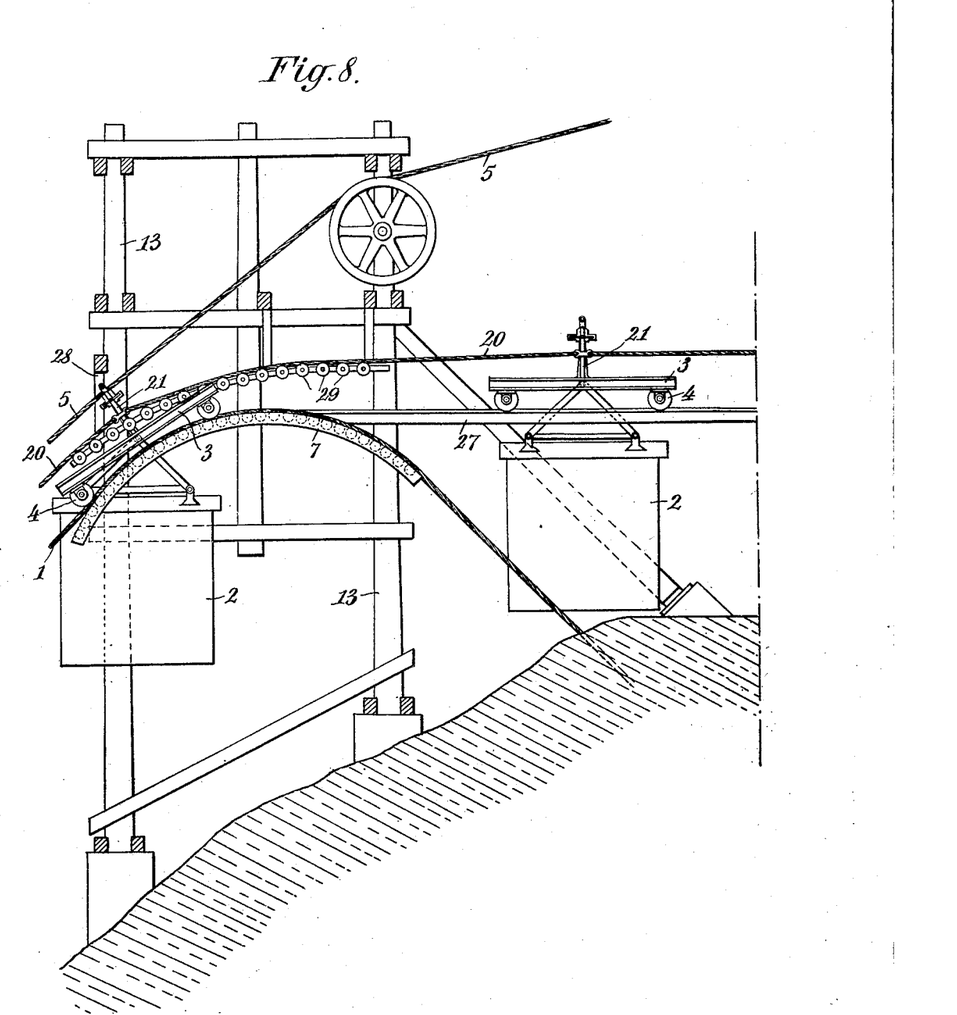
Figs. 8, 8ª and 8ᵇ are side elevations, partly in section, showing the left, middle and right portion, respectively, of the upper or driving station of the suspension railway.
Figure 8A:
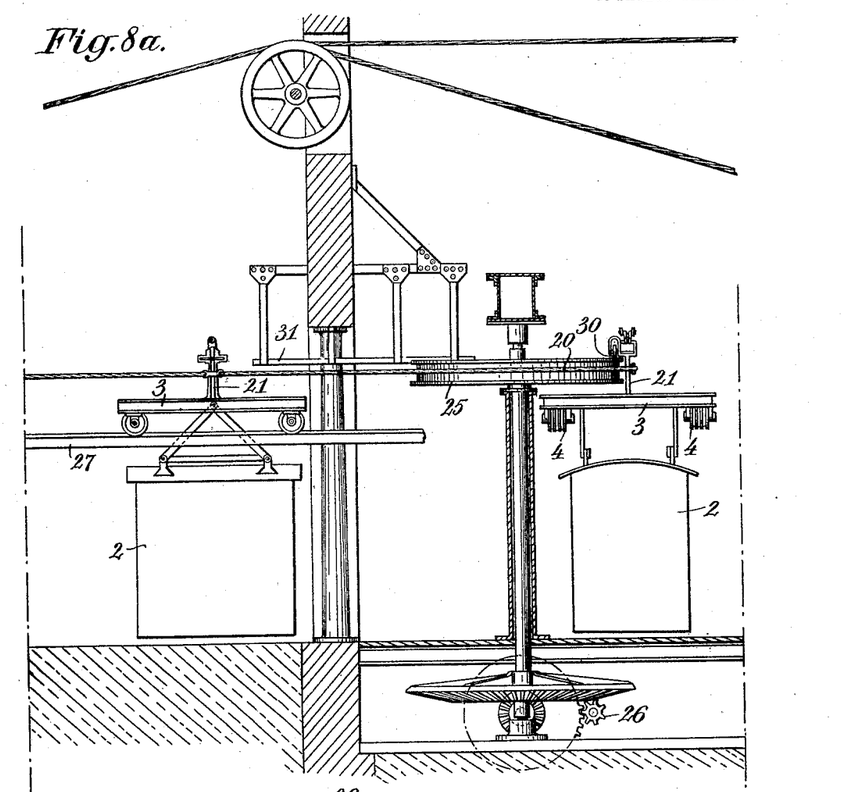
Figure 8B:
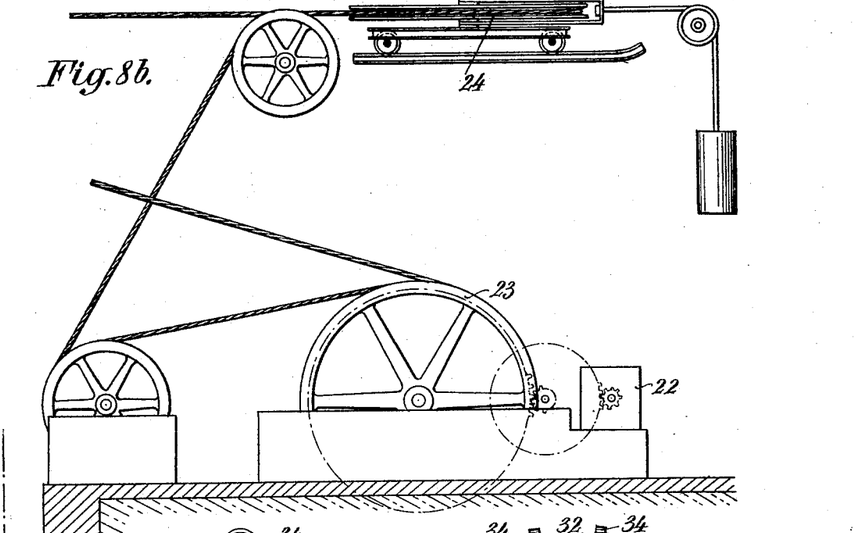
Figure 9:
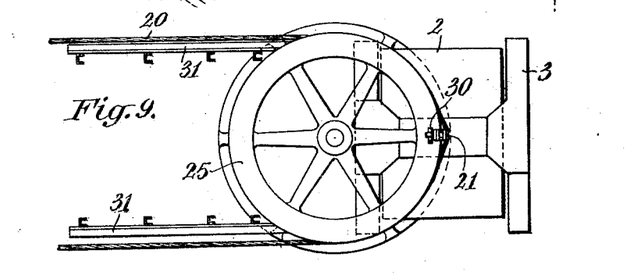
Fig. 9 is a top plan view of a detail of said station.

Referring now to Figs. 8, $8^a$, $8^b$ and 9 at the driving station the carrying ropes 1 are led to a standard 13 of suitable construction, over a long support 7, which is firmly mounted at the requisite slant on several uprights of the standard and are anchored in the ground. For driving the cars not only an upper traction rope 5 detachably connected to the latter, but also a second traction rope 20 mounted below the former is employed, this latter rope being fastened to standards 21 mounted on the trolleys 3 and connecting the cars one with another. This traction rope 20 constitutes a safety device in case the rope 5 breaks or a car becomes detached from the latter; further, the rope 20 determines and maintains the distances between the cars. The traction rope 5 is led in known manner about a driving pulley 23 driven by an electric motor 22 and about a tensioning device 24. The second traction rope 20 runs to a horizontal driving pulley 25 driven by an electric motor 26 having a common starting switch with the motor 22. From the support 7 of the carrying rope 1 rails 27 run into proximity with the pulley 25 and guide the trolleys 3 and cars 2 to this pulley. The cars are released from the traction rope 5 at the place designated 28 where the two ropes 5, 20 which have hitherto been parallel separate from each other either automatically or owing to a stop fixed on the upper traction rope 5, and the cars are now drawn along the rails 27 only by the lower traction rope 20. This rope 20 is guided at the standard 13 over a row of rollers 29 so arranged that they do not prevent free movement of the car (Figs. 8 and 11). As clearly shown in Figs. $8^a$, 10, 11 and 12 the standard 21 on each trolley 3 carries a lateral guide roller 30 which is located higher than the traction rope 20, and when the cars reach the end of the rails 27 the roller 30 runs onto a middle rail 31, which leads to the horizontal pulley 25. As the car is driven by the rope 20, the roller 30 leaves the rail 31 and runs on the rim of the pulley 25 which is so formed that it now carries the car, as shown in Figs. $8^a$ and 9 and transfers it from the incoming to the outgoing part of the railway. During this part of its travel the standard 21 on the trolley 3 is pressed against the periphery of the pulley 25 by the pull on the rope 20.

Figure 10:
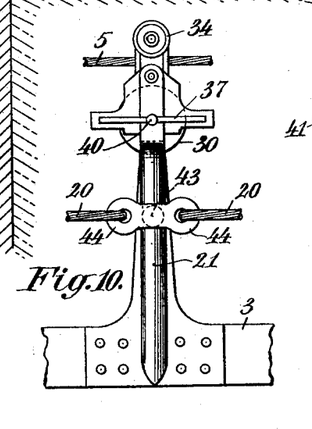
Figs. 10, 11 and 12 are side and end elevations, and plan, respectively, on an enlarged scale, showing the standard mounted on the trolley.
Figure 11:
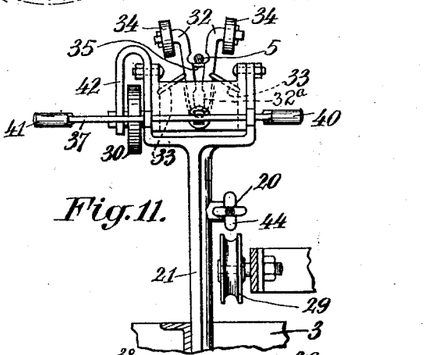
Figure 12:
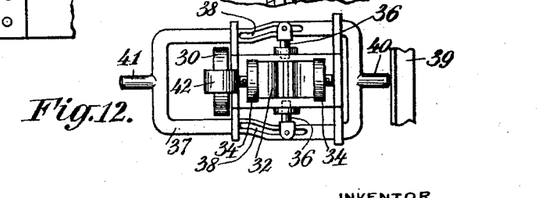

Referring to Figs. 10 to 12, the standard 21 on the trolley 3 carries at its upper, forked end the clamping jaws 32 for securely holding the upper traction rope 5. These jaws are guided vertically in the standard 21 and so connected therewith by links 33 that when they are raised they open, while when they are lowered they close. Both movements can be effected automatically by means of stops which are located near the track and coact with the outer ends of the jaws 32 carrying antifriction rollers 34. In this case a stop 35 is arranged below the mouth of the jaws 32; the stop bridges over the gap between these jaws and is carried by one of the jaws, but does not prevent free relative movement thereof. When the rope 5 enters the jaws 32 it bears on the stop 35 and forces the jaws 32 down so that they close under the action of the links 33 and firmly clamp the rope 5. The jaws 32 are provided above their common pivot each with an inner cavity $32^a$ (Fig. 11) forming together a slot when the jaws are closed, and pins 36 being pushed in said slot between the jaws in their lowered or clamping position, hold the jaws fast against raising and secure them in said clamping position. Before releasing the rope 5 from the trolley 3 the pins are forced back so that they release the jaws 32 and said jaws may be raised so that they open and release the rope. For actuating the pins 36, a frame 37 is employed which is guided transversely on the standard 21 in whose slanting longitudinal slots 38 the pins 36 are held (Fig. 12). Therefore when the frame 37 is displaced in one direction these pins engage the jaws 32, and when this frame is displaced in the other direction they are disengaged from these jaws. For moving the frame 37 to and fro stops 39 are arranged at desired places alongside the track, and these stops are adapted to bear against lugs 40, 41 on the frame. In one prong 42 of the forked end of the standard 21 is journaled the roller 30 which carries the car on the pulley 25. About half way up this standard and on the side thereof remote from the roller 30 is arranged a cross-piece 43 having two eyes into which the traction rope 20 is fastened. This cross-piece is mounted at the side of the standard 21 in order to enable the traction rope 20 to be guided over the rollers 29. Nevertheless the traction ropes 5, 20 are located sufficiently close to one another in order that when only one rope, e. g. 20, is in action, no change in the correct position and certainty of movement may occur. The ropes 5 and 20 may obviously be located exactly one over the other.

Figures 14, 18, 19, 20:
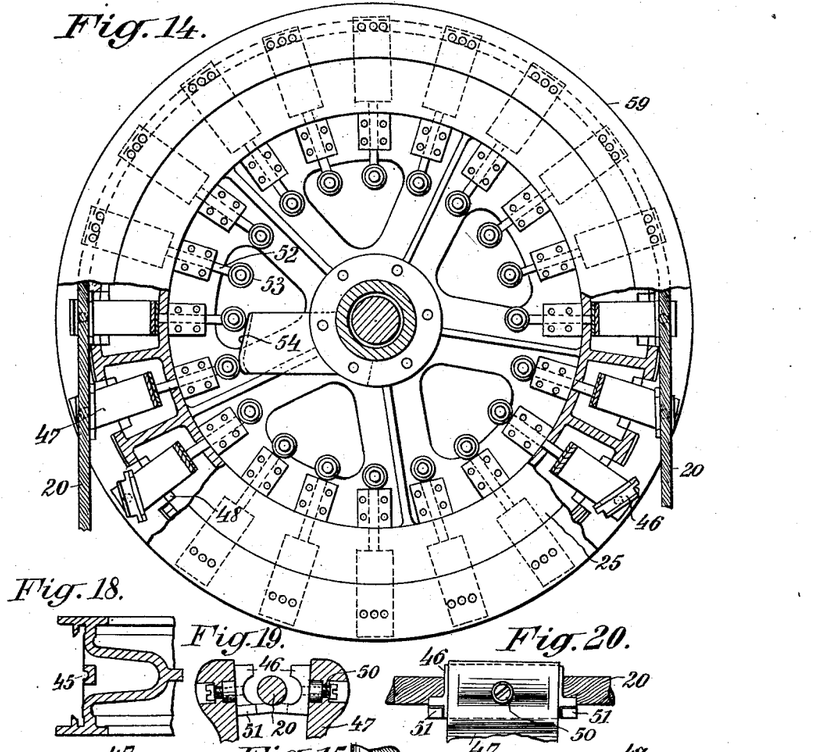
Figs. 14 and 15 are top plan views, partly in horizontal section, and vertical section, respectively, showing one form of driving pulley for a traction rope.
Figs. 18, 19 and 20 are detail views of parts of the pulley shown in Figs. 14 and 15.
Figure 15:
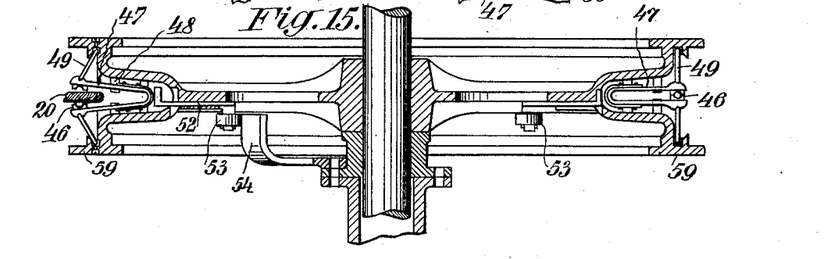
Figure 16:
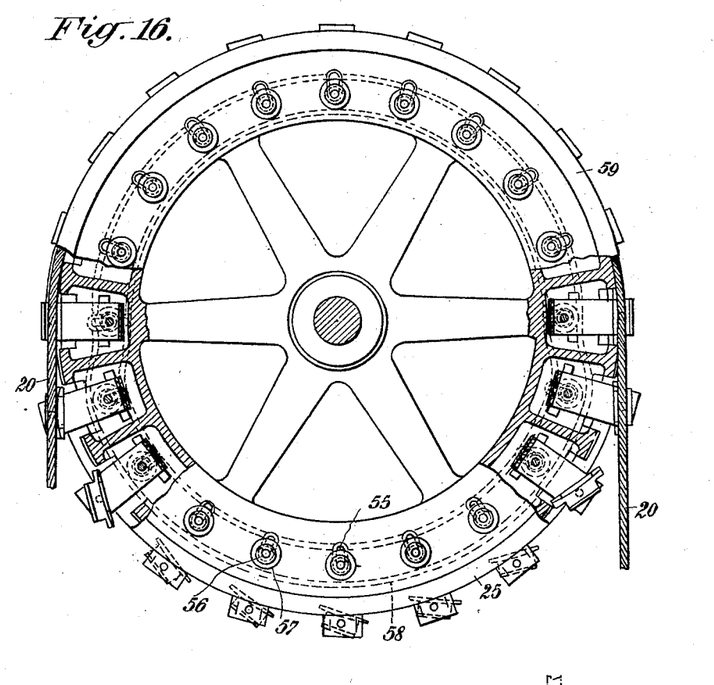
Figs. 16 and 17 are like views, respectively, showing a modified form.
Figure 17:
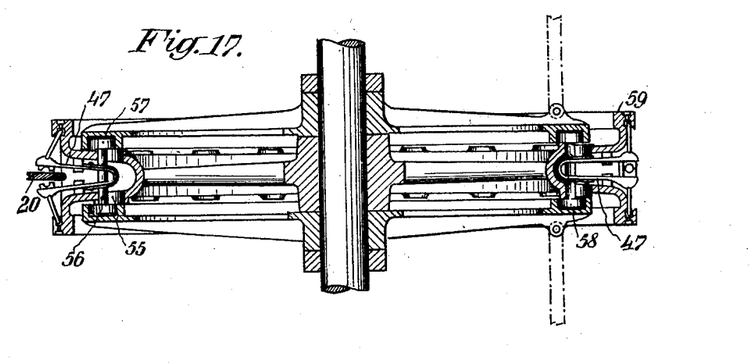

As shown in Figs. 14 and 15, the sheave 25 driving the traction rope 20 is provided with several clamping jaws 46 which are located in the grooves 45 (Fig. 18) and are uniformly distributed around the periphery of the sheave. These jaws are guided radially between the lugs 48 in the rim of the sheave by means of U-shaped springs 47 at the ends of which jaws are mounted. The ends of the springs 47 are connected by rods 49 in such manner with the rim of the sheave 25 that when the spring is pushed outwardly, the ends thereof together with the jaws 46 move apart, whereas when the spring 47 is pushed inwardly these ends close owing to pressure of the rods 49 overcoming the action of the spring. In the position in which the jaws are pushed back, i. e. in their closed position, the throat of the jaws 46 forms a continuation of the groove 45 which is interrupted at the jaws. These jaws 46 at the ends of the spring 47 are rotatable about pins 50 (Figs. 19, 20) and so adjust themselves to the direction of pull on the rope 20 when entering and leaving, as clearly shown in Fig. 14. The jaws 46 are broader than the spring 47 and take one into the other owing to the provision of lugs 51; the latter also bridge over the space between the jaws even when the latter are open and form a stop for the entering rope 20 which, as the sheave rotates further, drives the springs 47 inwardly and thus closes the jaws 46. As the lugs 51 are arranged at the sides of the springs they do not prevent the jaws closing and opening freely. Each spring 47 of the jaws 46 abuts at its inner end against a radial guide rod 52 carrying at its inner end a laterally mounted roller 53. This device is for facilitating the opening of the jaws. To this end, at the place at which the rope 20 leaves the sheave 25 a stationary, radial cam 54 having an outwardly slanting face is provided, against which the rollers 53 run and thus drive outward the springs 47 and open the jaws 46. Owing to the jaws being automatically closed the standard 21 is caused to bear properly on the periphery of the sheave 25 at the place at which the rope 20 is connected to this standard, the jaws 46 remaining however partly opened, whereas when the jaws are positively closed the construction of the apparatus must be very precise in order to avoid damage to the standard or to the traction rope. In a suitable modification of the sheave 25 (Figs. 16 and 17) the jaws 46 may, however, be positively closed. In this modification the springs 47 are provided with transverse pins 56 guided in radial slots 55 in the sheave; each pin carries at its ends antifriction rollers 57 which are guided in stationary, non-circular grooves 58, and which radially displace the spring 47 to close and open the jaws 46. In both forms of the sheave or driving pulley 25 it has on its rim a sufficiently wide track on which the rollers 30 on the standards 21 of the trolleys 3 can run.

Figure 13:
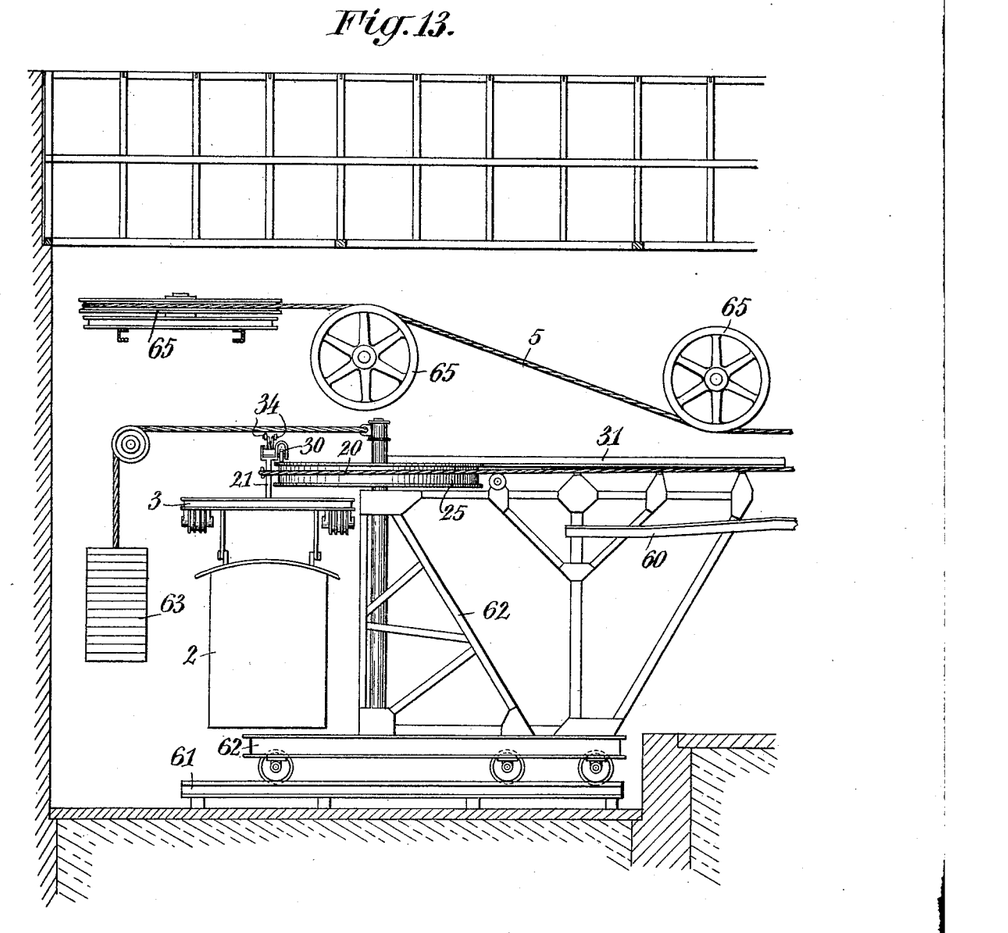
Figs. 13 and 13ª are side elevations, partly in section, of left and right portions, respectively, of the lower station of the suspension railway.
Figure 13A:
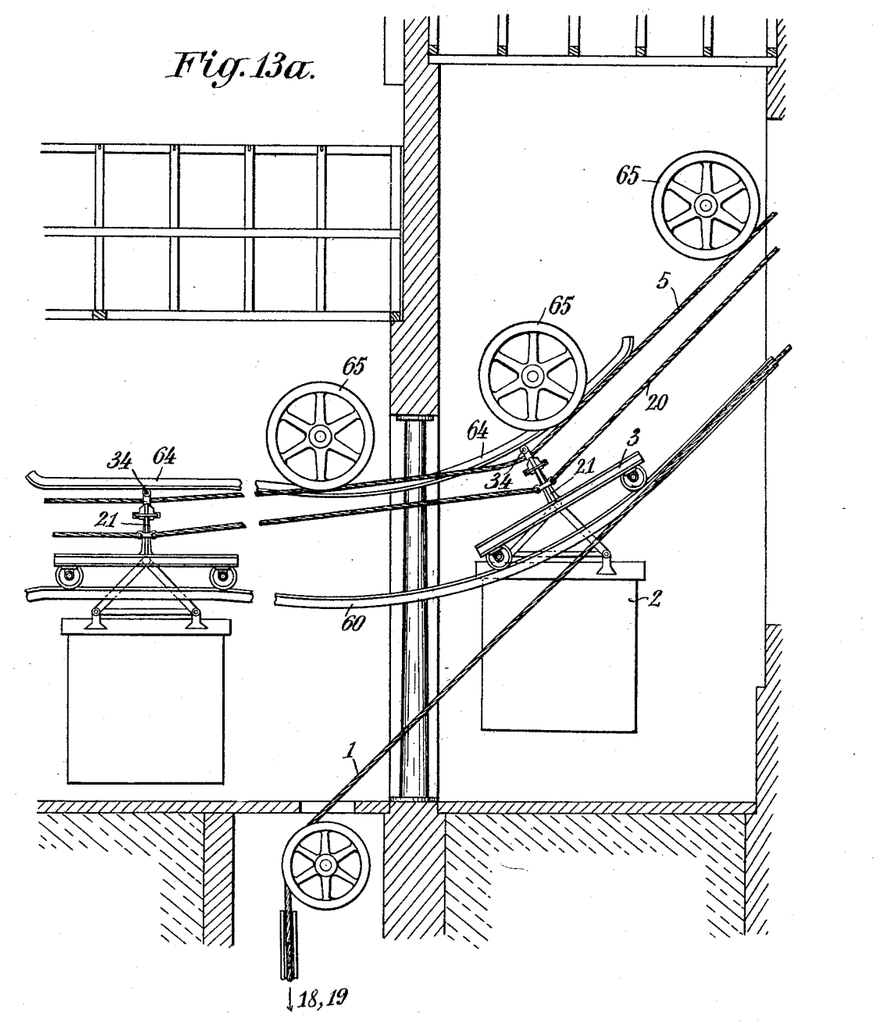

At the lower station (Figs. 13, 13$^a$) the carrying ropes 1 are tensioned by means of weights 18, 19 (Figs. 6, 7.) Associated with the carrying ropes 1 are curved rails 60 which run out horizontally and guide the cars to the upper rails 31, on which the cars are guided by means of the rollers 30 on the standards 21 until they arrive at the clamping pulley 25 which transfers the cars to the return rail 60. The pulley 26 and the two rails 31 are carried by a framework 62 which can travel on rails 61 and which is subjected to the action of a tensioning weight 63 which keeps the traction rope 20 at its proper tension. Above the guide rails 60 are mounted guide rails 64 on which the rollers of the standards 21 run and keep the trolleys 3 on the rails 60 so that the trolleys cannot be lifted from the latter by a pull on the ropes 5 and 20. The return rails 60 rise gradually toward the guide rails 64 so that they elevate the car 2, 3 up to the traction rope 5, the clamping jaws 32 being pressed downwardly, and the traction rope 5 which enters between the jaws in front of the rails 64 and in some cases partly closes the same being clamped. The traction rope 5 is guided in the station by suitable sheaves 65.

Figure 21:
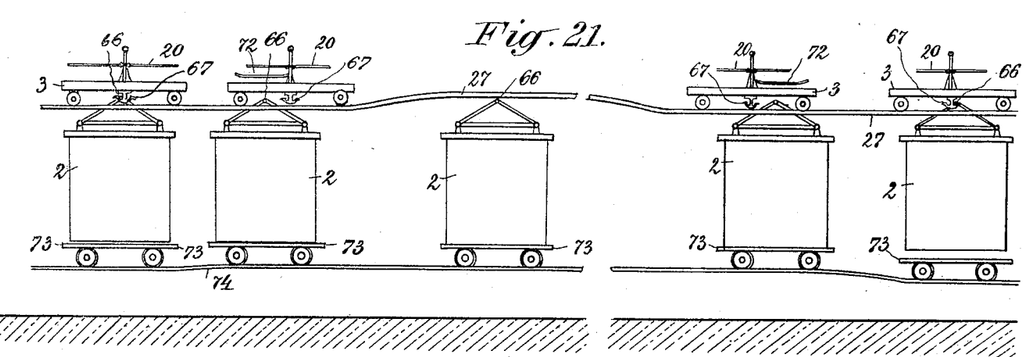
Figs. 21 and 22 are elevation and plan, respectively, showing rails at a junction station between two sections of railway.
Figure 22:
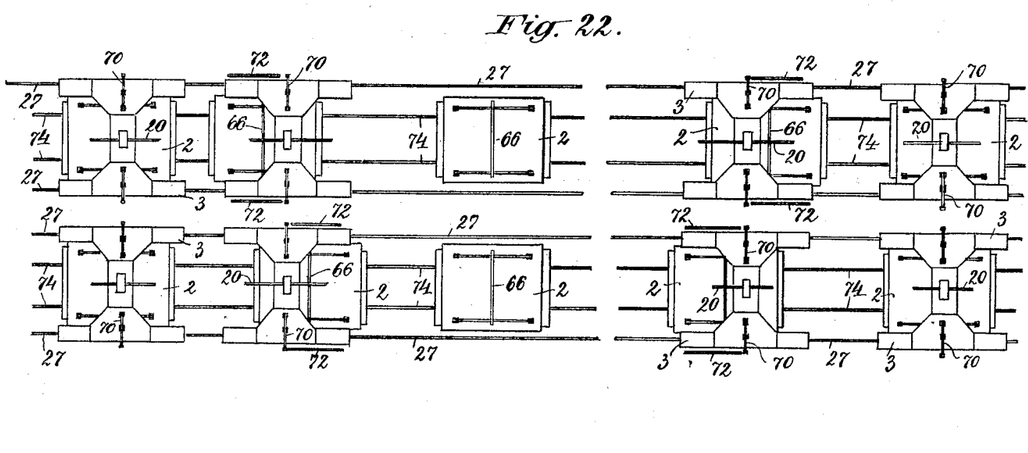
Figures 23, 24, 25:
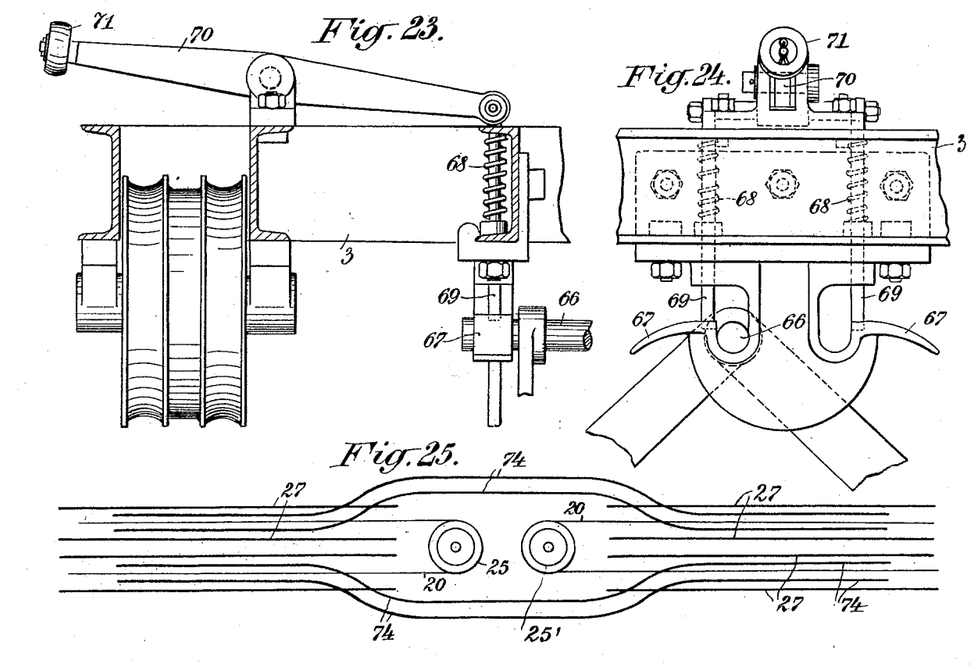
Figs. 23 and 24 are elevations, partly in section, showing mechanism for suspending the car from the trolley.
Fig. 25 is a plan view of part of the railway.

Long lengths of railway are divided in known manner into short sections, each of which has its own drive, stations being erected at the junctions. For transferring the cars from one section to another I provide the following arrangements:—As shown in Figs. 21 and 22, the passenger car 2 is hung with its suspension axle 66 in a hook-like support 67 on the trolley 3 (Figs. 23, 24). The mouth of this hook, which is preferably a double hook, is closed by means of a vertically guided pin 69 which is acted on by a closing spring 68 and is connected to one end of a two-armed lever 70 fulcrumed on the trolley 3; the other end of this lever projects from the side of the trolley and preferably carries an antifriction roller 71. In front of the clamping pulleys 25 are arranged guide rails 72, which rock the lever 70 of the car 2 passing below them and raise the pin 69 against the action of its spring, thus opening the hook 67 and consequently allowing the car 2 to be unhooked from the trolley 3. For raising and unhooking the car 2 as well as for propelling the same farther, I provide at the stations trucks 73 which run on rails 74 which are up-grade when the car 3 is unhooked and down-grade when the latter is re-suspended (Figs. 21, 22). The trucks 73 can be driven either separately by an electric motor, or by a common traction rope, or in any other suitable manner. In front of the clamping pulley 25 at a station a truck 73 travels under the arriving car 2, runs up the up-grade rails 74 until it unhooks the car 2, whereupon the latter is lifted out of the hook 67 which is opened by the rail 72 owing to a retardation or acceleration in the travel of the truck 73 together with the car 2 according as the suspension-axle 66 of the car 2 is either located in the rear or front part of the hook 67. Thereupon only the trolley 3 is transferred by the clamping pulley 25 to the return track, while the car 2 which rests on the truck 73 is propelled over the rails 74 where it may be stopped to discharge and receive passengers whereupon it travels on to the clamping pulley 25′ of the other section (Fig. 25). Beyond this pulley 25′ the car is first resuspended in the hook 67 of the trolley 3 which is opened by the guide rail 72, is then lowered owing to the down-grade rails 74 and is finally released from the truck 73. By means of a switch or the like, this truck is then transferred to the rails 74 of the return track. In this manner discharging and loading may be carried out independently of the motion of the cars traveling on the railway. A similar arrangement can be provided at the termini simply for the purpose of relieving the clamping pulley 25 which otherwise transfers the trolleys 3 together with the cars 2.

What I claim as my invention and desire to secure by Letters Patent is:

1. In a suspension railway or rope-way, the combination of supports, carrying ropes passing continuously over the supports without being secured to them, a guide rail projecting above said ropes without deflecting the same, said guide rail being adapted to raise the car from the carrying ropes, and means on each support for guiding and allowing longitudinal displacement of said ropes, substantially as described.

2. In a suspension railway, the combination of a plurality of carrying ropes, standards, supports on the latter for supporting said ropes, a guide rail mounted on each support, extending upwardly above said ropes and being adapted to raise the car from the carrying ropes, each support comprising a plurality of rollers, and a grooved ring carried by said rollers and adapted to guide and support a rope, substantially as described.

3. In a suspension railway or rope-way, the combination of two groups of carrying ropes arranged one beside another, a trolley supported by said ropes, and a car suspended from the trolley between the groups of ropes; one rope of one group at one side of the car being connected to a rope of another group at the other side of the car, and means for tensioning those ropes of two groups which are connected together, substantially as described.

4. In a suspension railway, the combination of two groups of carrying ropes, a plurality of trolleys supported by said ropes, a plurality of cars each suspended from a trolley and depending between the said groups, a traction rope detachably connected to the trolleys, and a second traction rope connecting the trolleys one with another, substantially as described.

5. In a suspension railway, the combination of two rope ways each comprising two groups of carrying ropes, a plurality of trolleys supported by said ropes, a plurality of cars each suspended from a trolley and depending between said groups, a traction rope detachably connected to the trolleys, and a second traction rope connecting the trolleys one with another, the said second traction rope being adapted to transfer the trolleys from one rope way to the other after their release from the former traction rope, substantially as described.

6. In a suspension railway, the combination of the two groups of carrying ropes, a plurality of trolleys supported by said ropes, a plurality of cars each suspended from a trolley and depending between said groups, a standard mounted on each trolley, a traction rope, means on said standard for clamping and releasing said traction rope, a pair of eyes mounted on said standard approximately directly below said means, and a second traction rope divided into sections connecting the eyes of standards on consecutive trolleys, substantially as described.

7. In a suspension railway, the combination of two groups of carrying ropes, a plurality of trolleys supported by said ropes, a plurality of cars each suspended from a trolley and depending between said groups, a standard mounted on each trolley, a traction rope, a pair of clamps mounted on said standard, stationary abutments alongside the railway, means carried by the standard and adapted to coact with said abutments for opening and closing said clamps to release and clamp said traction rope, and a second traction rope connecting the cars one with another, substantially as described.

8. In a suspension railway, the combination of two groups of carrying ropes, a plurality of trolleys supported by said ropes, a plurality of cars each suspended from a trolley and depending between the ropes of said groups, a standard mounted on each trolley, a traction rope, a pair of clamps mounted on said standard and normally embracing said traction rope, a pair of pins slidable in said standard for opening and closing said clamps, stationary abutments alongside the railway, means carried by each standard and adapted to coact with said abutments for actuating said pins, and a second traction rope connecting the cars one with another, substantially as described.

9. In a suspension railway, the combination of two rope ways each comprising two groups of carrying ropes, a plurality of trolleys supported by said ropes, a plurality of cars each suspended from a trolley and depending between said groups, a traction rope detachably connected to the trolleys, and a second traction rope connecting the trolleys one with another; a driving pulley mounted between the ropeways and carrying said second traction rope, a standard mounted on each trolley, and a roller mounted on said trolley for supporting the latter on the upper face of said pulley, substantially as described.

10. In a suspension railway, the combination of two ropeways each comprising two groups of carrying ropes, a plurality of cars each suspended from and depending between said groups, a traction rope connecting the cars one with another, a driving pulley mounted between the ropeways, means for supporting the cars on said driving pulley, and means mounted in said driving pulley for clamping and releasing said traction rope, substantially as described.

11. In a suspension railway, the combination of two ropeways each comprising two groups of carrying ropes, a plurality of cars each suspended from and depending between said groups, a traction rope connecting the cars one with another, a driving pulley mounted between the ropeways, means for supporting the cars on said driving pulley, and means mounted in said driving pulley for automatically clamping and releasing said traction rope, substantially as described.

12. In a suspension railway, the combination of two ropeways each comprising two groups of carrying ropes, a plurality of cars each suspended from and depending between said groups, a traction rope connecting the cars one with another, a driving pulley mounted between the ropeways, means for supporting the cars on said driving pulley, and positively actuated means mounted in said driving pulley for clamping and releasing said traction rope, substantially as described.

13. In a suspension railway, the combination of two ropeways each comprising two groups of carrying ropes, a plurality of cars each suspended from and depending between said groups, a traction rope connecting the cars one with another, a driving pulley mounted between the ropeways, means for supporting the cars on said driving pulley, a plurality of normally open clamps for clamping said traction rope, said clamps being radially slidable in said pulley and having lugs extending across and inside their operative faces, means coacting with the pulley for closing said clamps on their inward movement, a stationary cam, and means coacting with said cam for reopening said clamps after closure, substantially as described.

14. In a suspension railway, the combination of two ropeways each comprising two groups of carrying ropes, a plurality of cars each suspended from and depending between said groups, a traction rope connecting the cars one with another, a driving pulley mounted between the ropeways, means for supporting the cars on said driving pulley, a plurality of clamps mounted in the periphery of the pulley and adapted to clamp and release the traction rope, a continuous stationary channel, and means carried by the pulley and movable in said channel for actuating said clamps, substantially as described.

15. In a suspension railway, the combination of two ropeways each comprising two groups of carrying ropes, a plurality of cars each suspended from and depending between said groups, a traction rope connecting the cars one with another, a driving pulley mounted between the ropeways, means for supporting the cars on said driving pulley, and a plurality of clamps mounted in said pulley and adapted to clamp and release the traction rope, the jaws of said clamps being pivotally mounted on the limbs thereof, substantially as described.

16. In a suspension railway, the combination of two ropeways each comprising two groups of carrying ropes, a plurality of trolleys supported by said ropes, a plurality of cars each suspended from a trolley and depending between said groups, a traction rope detachably connected to the trolleys, and a second traction rope connecting the trolleys one with another; a pulley located between said ropeways and carrying said second rope, and means for applying a tension to said pulley laterally of its axis, substantially as described.

17. In a suspension railway, the combination of two ropeways each comprising two groups of carrying ropes, a plurality of trolleys supported by said ropes, a plurality of cars each suspended from a trolley and depending between said groups, a traction rope detachably connected to the trolleys, and a second traction rope connecting the trolleys one with another; a frame located at one end of each ropeway and adapted to travel in the direction of the ropeways, a pulley mounted on said frame and carrying said second traction rope, and a tensioning weight operatively connected to said frame in its direction of travel, substantially as described.

18. In a suspension railway, the combination of two ropeways divided into a plurality of sections, each ropeway comprising two groups of carrying ropes, a plurality of trolleys supported by said ropes, a plurality of cars each detachably suspended from a trolley and depending between said groups, a traction rope connecting the trolleys on one section one with another, a pulley carrying said traction rope located at the end of each section, and means for detaching said cars from said trolleys when the former approach the pulleys and for suspending the cars on the trolleys of the next section, substantially as described.

19. In a suspension railway, the combination of two ropeways divided into a plurality of sections, each ropeway comprising two groups of carrying ropes, a plurality of trolleys supported by said ropes, a plurality of cars each detachably suspended from a trolley and depending between said groups, a traction rope connecting the trolleys on one section one with another, a pulley carrying said traction rope located at the end of each section, a traveling truck adapted to run between the sections and to disengage a car from a trolley on one section and engage it with a trolley on another section, substantially as described.

20. In a suspension railway, the combination of two ropeways divided into a plurality of sections, each ropeway comprising two groups of carrying ropes, a plurality of trolley hooks supported by said ropes, a plurality of cars each detachably suspended from a trolley hook and depending between said groups, a traction rope connecting the trolleys on one section one with another, a pulley carrying said traction rope located at the end of each section, and means for detaching a car from a trolley on one section when the same approaches a pulley and for suspending the car on a trolley on the next section; automatic means normally closing each hook, stationary abutments located near the ropeways, and means adapted to coact with said abutments for opening said automatic means, substantially as described.

21. In a suspension railway, the combination of two ropeways divided into a plurality of sections, each ropeway comprising two groups of carrying ropes, a plurality of trolley hooks supported by said ropes, a plurality of cars each detachably suspended from a trolley hook and depending between said groups, a traction rope connecting the trolleys on one section one with another, a pulley carrying said traction rope located at the end of each section; a track comprising up-grade rails at the end of one section and down-grade rails at the beginning of the next, and a truck movable on said rails for raising a car from one hook and lowering the same onto another hook, substantially as described.

In testimony whereof I have affixed my signature in presence of two witnesses.

TITUS THUNHART.

Witnesses:
KARL REHAK,
VÁCHEW PLATZER.

Copies of this patent may be obtained for five cents each, by addressing the "Commissioner of Patents, Washington, D. C."